United States Patent [19]
Daley, III

[11] Patent Number: 6,167,413
[45] Date of Patent: Dec. 26, 2000

[54] WEARABLE COMPUTER APPARATUS

[76] Inventor: Charles A. Daley, III, 10 Woodgate Ct., Hillsborough, Calif. 94010

[21] Appl. No.: 09/521,733

[22] Filed: Mar. 9, 2000

[51] Int. Cl.[7] .............................. G06F 3/00; G06F 1/16; G09G 5/00
[52] U.S. Cl. ..................... 708/139; 361/681; 361/683; 361/686; 361/730; 345/8
[58] Field of Search ........................... 708/139; 361/680, 361/681, 683, 686, 730; 345/7, 8, 30, 53

[56] References Cited

U.S. PATENT DOCUMENTS

| | | | |
|---|---|---|---|
| 5,491,651 | 2/1996 | Janik | 361/683 |
| 5,708,449 | 1/1998 | Heacock et al. | 345/8 |
| 5,844,530 | 12/1998 | Tosaki | 345/8 |
| 6,047,301 | 4/2000 | Bjorklund et al. | 708/139 |

*Primary Examiner*—Emmanuel L. Moise
*Attorney, Agent, or Firm*—Goldstein & Canino

[57] ABSTRACT

A wearable computer system includes a computing unit that is used with a visor mounted display system. The computing unit is structured to enable a user to grasp and support the computing unit, while simultaneously providing commands and information by way of a user interface (of the computing unit). The computing unit of the system may be housed within a multi-compartment case which is structured to provide access to the user interface. The case is further configured with a storage compartment to enable the user to securely store the visor mounted display when not being used. An auxiliary unit may also be included, which may be connected to the computing unit, to enable a user to enhance and augment the basic architecture of the wearable computing system.

20 Claims, 12 Drawing Sheets

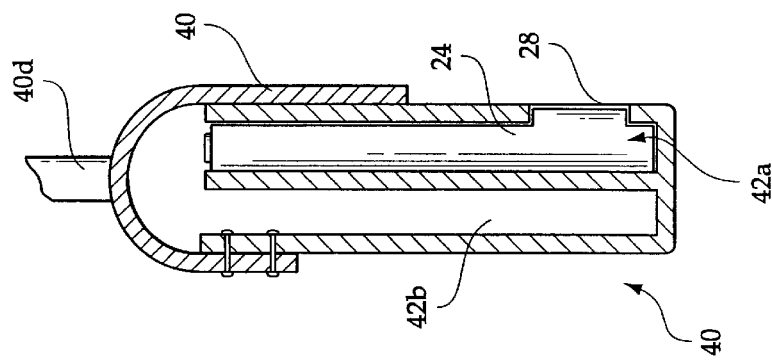
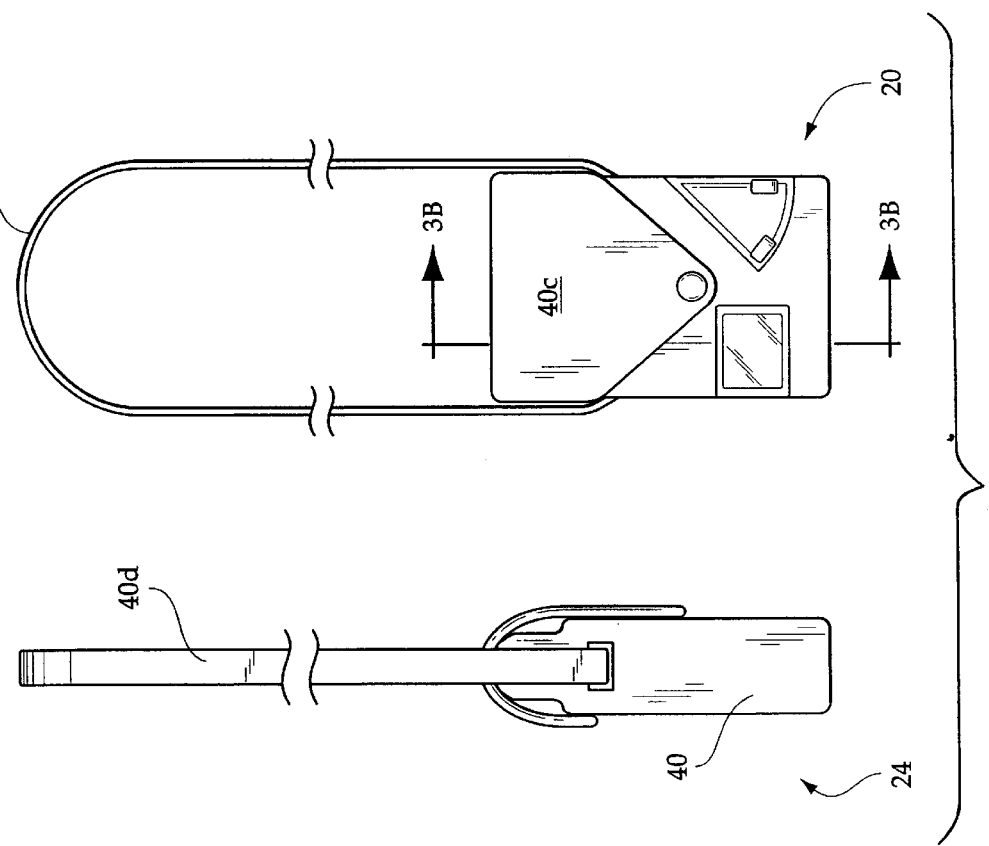
FIG. 3B
FIG. 3A

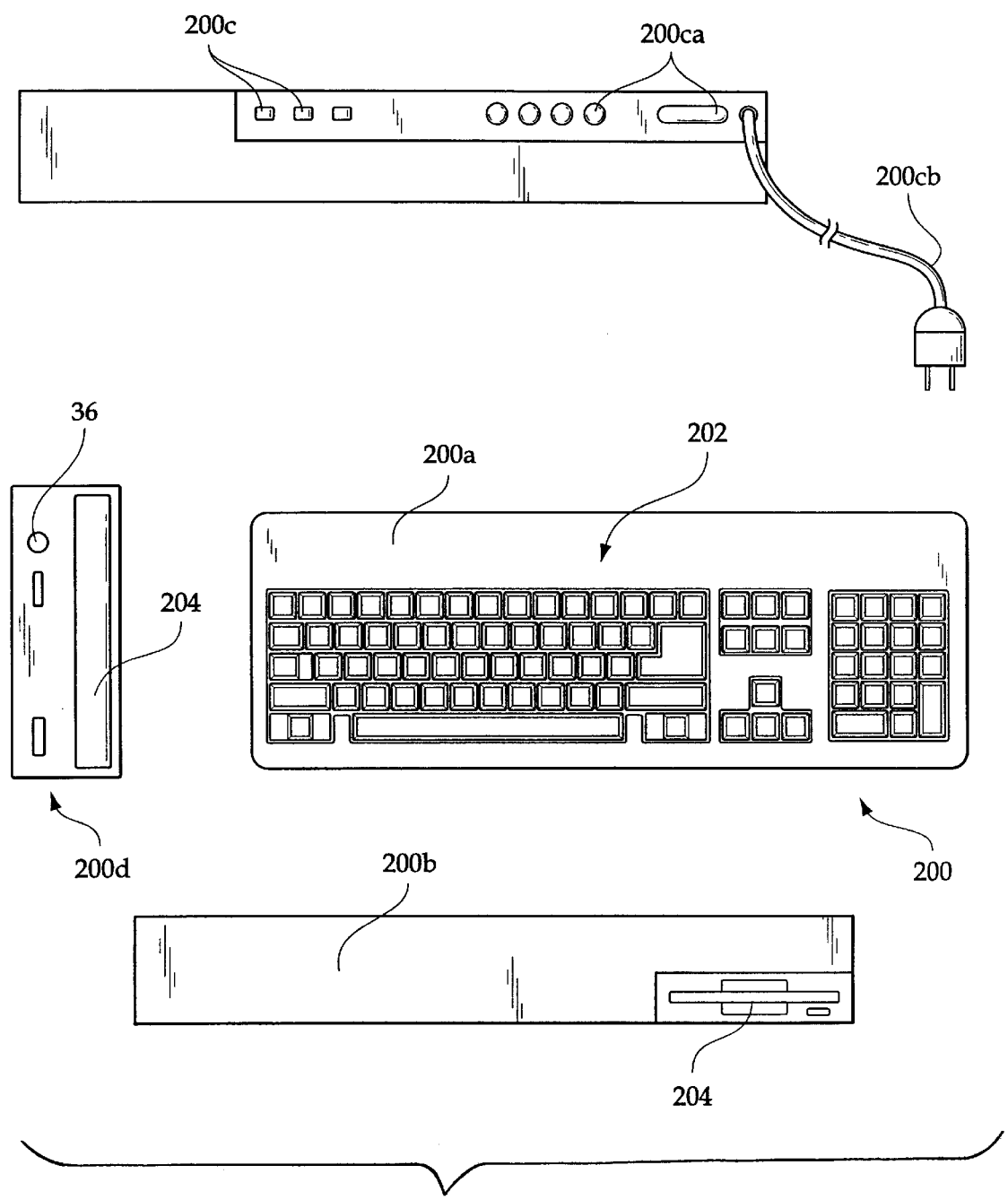

WEARABLE COMPUTER APPARATUS

CROSS REFERENCES AND RELATED SUBJECT MATTER

The subject matter of the present application is related to that of application Ser. No. 09/233,951 filed on Jan. 20, 1999, which is now U.S. Pat. No. 6,012,176, issued on Jan. 11, 2000, which is hereby incorporated by reference.

TECHNICAL FIELD

The present invention relates to portable and self-contained computer systems. More particularly, the invention relates to a wearable computer system including a personal computing unit, and a visor supported display a wearer employs to selectively view visual information.

BACKGROUND ART

Computer systems are available in a large variety of configurations. One broad category of computer systems includes portable computers that may be used in any one of a number of locations. Some are truly portable, while others are less so. For example, one common type of portable computing system is the common notebook personal computer. Notebook computers are compact when closed for transport, yet provide a nearly full sized keyboard and display when open and operated. This configuration of personal computer system is quite portable when compared to desktop equivalents, and may be transported and used in a variety of selected locations. Further, they may be configured to run on internal (battery) power, when a convenient A/C source is not available. However, this style of computer, and many smaller equivalent portable or embedded systems, must often be used with the aid of a table or desk, preferably with the user in a seated position. For example, the architecture of virtually all notebooks and similar sized computers requires the user to be seated with the computer preferably on an elevated working surface (or in the user's lap). In deed, one would find it almost impossible to stand and attempt to use such a computer without a working surface available.

Another popular class of personal or embedded computer is the so called 'personal digital assistant', or PDA. Popular PDAs are used to store and recall a variety of information including telephone numbers, addresses, schedule information, etc. These devices are typically held with one hand, while commands and information are provided via a user's other hand. Although, such a device may be used while standing, they too have several significant drawbacks. First, as these devices must preferably be small enough to fit into a pocket of a shirt or suit jacket, and they have very limited keyboards and viewing screens. Indeed, some of the presently most popular models have no keypad, a small display, and employ a small touch screen display. Accordingly, only a small amount of information may be presented to a user at one time, and information to be input must be slowly entered into the system when required. In addition, to use such a device, a user must take it out (say, from a pocket), turn it on, and support the PDA with one hand, while exchanging information and commands using the other hand. Importantly, even if an improved user interface (e.g., a small keypad or very small keyboard) were provided, when the system is used in a standing position, or while walking, one hand would be used to support the unit, while the other hand would be available to enter commands and information. As such, PDAs and equivalent personal computing systems do not provide an efficient and convenient architecture for many users, especially if the system is to be used intermittently over a short period of time.

Another class of personal computer known in the art is the 'wearable computer'. These systems have architectures wherein the main components of the system are generally supported by or upon a users body. As such, a user of a wearable computer may be termed the 'wearer' of the computer. One class of wearable computer provides for a head supported display, which may appear as a pair of goggles or heavy glasses to an onlooker. When considering the need to support the delivery of visual information (including text and or visual images) to a user via a hands free arrangement, this type of display technology may be most preferable. However, such arrangements significantly restrict the forward looking view or vision of a wearer. For example, the utility U.S. Pat. No. 5,708,449 to Heacock et al. teaches a 'binocular head mounted display system". However, the Heacock display arrangement, as well as others available in the art, are fixed in position. As such, when being worn by a user, these types of display devices significantly or totally restrict the forward looking view of a user. Therefore, if a wearer of such a display needs an improved forward looking view, the display must be removed or at minimum lifted. If removed, the user must then find a place to lay or store the display unit until it is further needed.

It would be desirable to provide a wearable computer having a display arrangement that enables a wearer to selectively view visual information (when necessary), while still providing at least limited forward looking vision to be maintained. In addition, a most preferred display means would significantly improve the forward looking view of a wearer/user when said visual information does not need to be viewed. Finally, it would be helpful for the wearer/user to be able to easily and quickly store a head supported display portion of the wearable computer until it is again needed. As skilled persons will appreciate, there are yet other limitations, issues, and problems that presently available wearable systems suffer from.

Therefore, the present invention provides new and improved wearable computer architectures including visor supported display arrangements having one or more of the following capabilities, features, characteristics, and or advantages:

- a compact, self-contained wearable computer;
- constructed with a main case to house a computing unit that is supported upon a wearer's body (say via a shoulder strap or a belt;
- includes a head supported (preferably visor mounted) display having a movable portion movable from a closed position (providing at least a partial forward looking view to the wearer) to an open position enabling visual information to be viewed by a wearer;
- may be configured to include a storage compartment to securely hold the visor mounted display;
- may be embodied as a modular system including an auxiliary unit that may be coupled to the computing unit to augment or enhance the operational capabilities of the wearable system, as required; and
- simple, modular, and economical construction.

The above listed capabilities, characteristics, and or associated novel features of the present invention, as well as others, will become apparent from a careful review of the description and figures provided herein. Attention is called to the fact, however, that the drawings and descriptions are illustrative only. Variations are contemplated as being part of the invention, limited only by the scope of the appended claims.

SUMMARY OF THE INVENTION

In accordance with the present invention, a highly portable, self-contained, wearable computer system includes a computing unit and a visor mounted display. The wearable computer system is arranged to be operated by a wearer in a plurality of positions (such as sitting, standing, laying down) and a plurality of environments (such as indoors, outdoors, in a darkened work space, etc.). A multi-compartment case is preferably included having at least a first compartment and second compartment. The computing unit may be secured within the first compartment, preferably with a user interface thereof conveniently accessible to a wearer, as required. The case of the wearable computer may be structured with a means to securely and removably support the case upon the body of a wearer. For example, a shoulder strap or waist belt may be provided to suitably secure the case (and therefore the computing unit contained therein) to the wearer.

In a most preferred embodiment the computing unit would be compact and portable, and suitably housed within the first compartment of the case such that a wearer may support the case for use with at least a first hand, while one or more fingers of the first hand may also be used simultaneously to actuate portions of a user interface, as required during the use and operation of the system.

The visor mounted display is operatively coupled to the computing unit and supported upon the head of a wearer when being used. The visor mounted display is structured to enable a movable portion thereof to be selectively moved by a wearer between a closed (up) position, enabling improved forward vision by the wearer when not in use, or an open (down) position enabling information to be viewed by the wearer on a display means of the visor mounted display. The viewed information is coupled from the computing unit to the display.

In a most preferred embodiment of the case a second compartment of the case is structured to securely accommodate the visor mounted display when not needed by the wearer. Other compartments may also be provided with embodiments of the wearable computer system, as required by specific applications in which the computer system is to be utilized.

Importantly, the wearable computer system of the present invention is contemplated to be provided by a modular architecture. In particular, an auxiliary unit may be included that may be operatively coupled to the computing unit to enhance and augment the wearable computer system architecture. For example, if an embodiment of the computing unit was too compact to include a removable read/write storage device (e.g., a floppy or magnetic r/w device), such a storage device may be included in an auxiliary unit and available whenever the computing unit and auxiliary unit are operatively coupled to each other. As skilled persons will appreciate, the auxiliary unit may be configured to include what ever devices and peripherals are not provided by the computing unit. In particular, a most preferred version of an auxiliary unit may include a full or nearly full sized keyboard that enables information to be conveniently input to the computing unit by a user. In addition, a preferred embodiment of an auxiliary unit may further include a power supply module configured to charge one or more internal batteries (of the computing unit) whenever the auxiliary unit is operatively coupled to the computing unit. Skilled individuals will realize that many devices and or sub-systems may be included with differing embodiments of computing units and auxiliary units. For example, either unit may be configured to include devices including a microphone, a camera, a global satellite positioning (GPS) module, a high capacity read/write drive, a modem, and or an Ethernet interface.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted represent one of a number of possible arrangements utilizing the fundamental concepts of the present invention. The drawings are briefly described as follows:

FIGS. 3A and 3B provide full and partial sectional views, respectively, of an embodiment of a case and a computing unit of the invention.

FIG. 10 provides a plurality of orthogonal views of an embodiment of an auxiliary unit of the invention.

Figure 1:
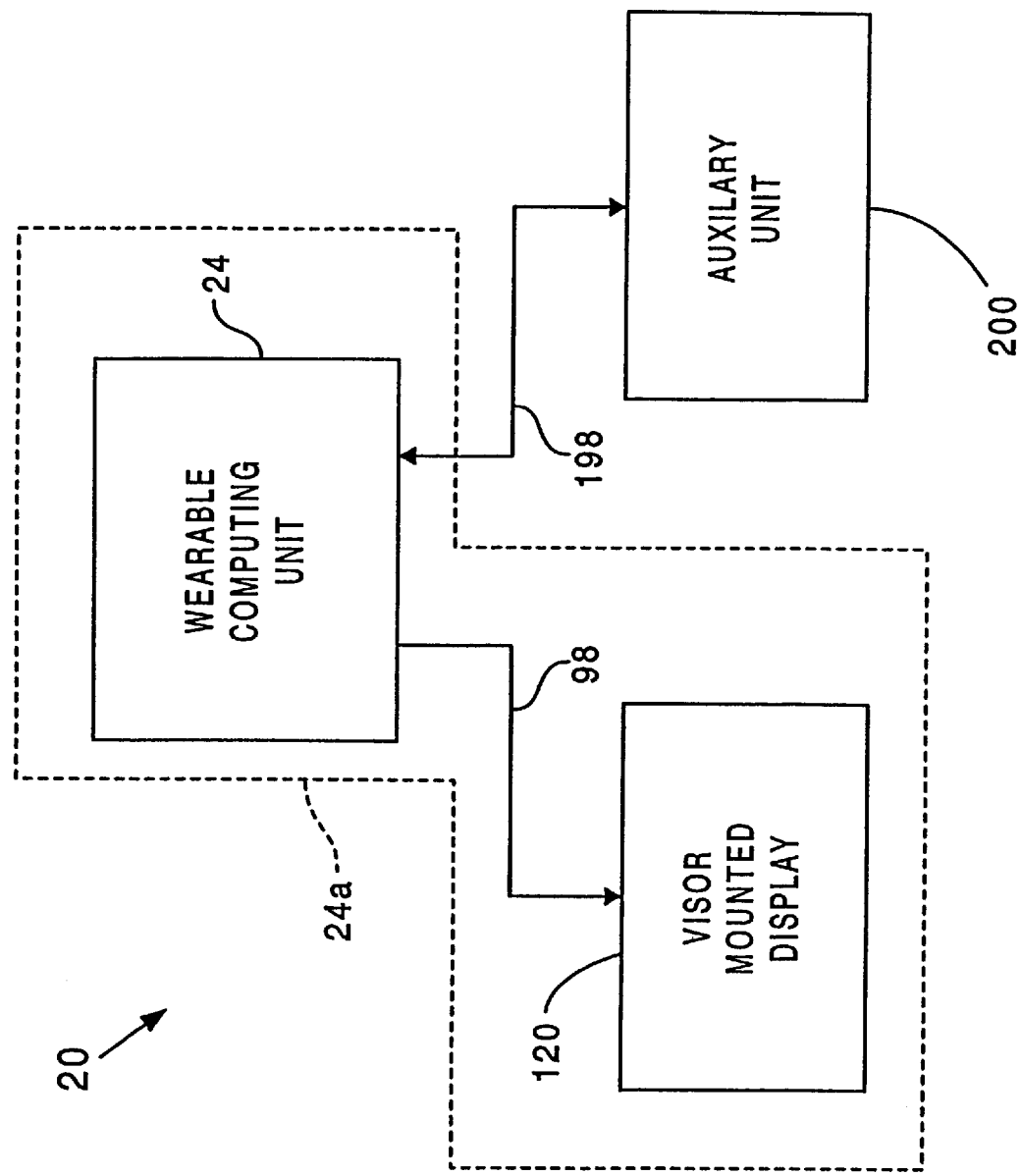
FIG. 1 depicts a generalized high level functional block diagram of a wearable computer system in accordance with the present invention.

Partial List Of Reference Numerals Used In The Drawings

| | |
|---|---|
| 20 | (self-contained) wearable computer system |
| 24 | (wearable) computing unit |
| 26 | computing module |
| 28 | user interface |
| 30 | communication module |

-continued

Partial List Of Reference Numerals Used In The Drawings

| | |
|---|---|
| 32 | audio module |
| 34 | touch pad (pointing device) |
| 36 | push button switches (p/o switch means) |
| 40 | case |
| 40a | first surface (of case) |
| 40b | second surface |
| 40c | flap |
| 40d | strap |
| 42a | first compartment of case |
| 42b | second compartment of case |
| 98 | (operative) link |
| 118 | cap (having a visor) |
| 120 | visor supported display |
| 124 | main portion (of housing) |
| 124a | partition support wall |
| 126 | movable portion (of housing) |
| 128 | interior cavity |
| 128a | opening |
| 130 | visor (or bill) |
| 134 | hinge means |
| 140 | reflective surface |
| 144 | display module |
| 144a | active display element(s) |
| 198 | (operative) link |
| 200 | auxiliary unit |
| 202 | keyboard |
| 204 | removable storage (device or drive) |
| 206 | interface |
| 208 | power supply module |

DETAILED DESCRIPTION OF PREFERRED EMBODIMENTS

Figure 5A:
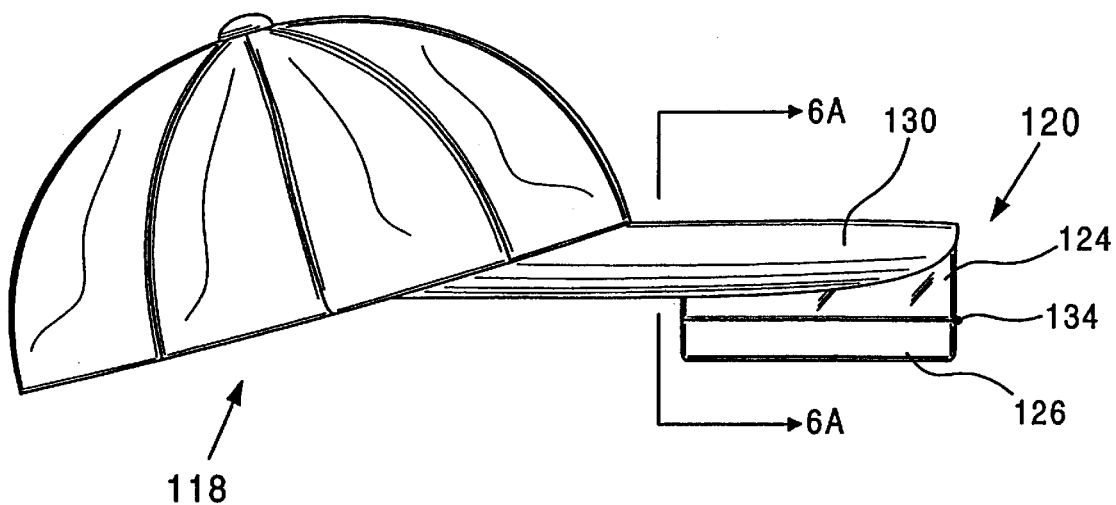
FIGS. 5A and 5B depict a profile view of a visor mounted or supported display system in accordance with the present invention.
Figure 5B:
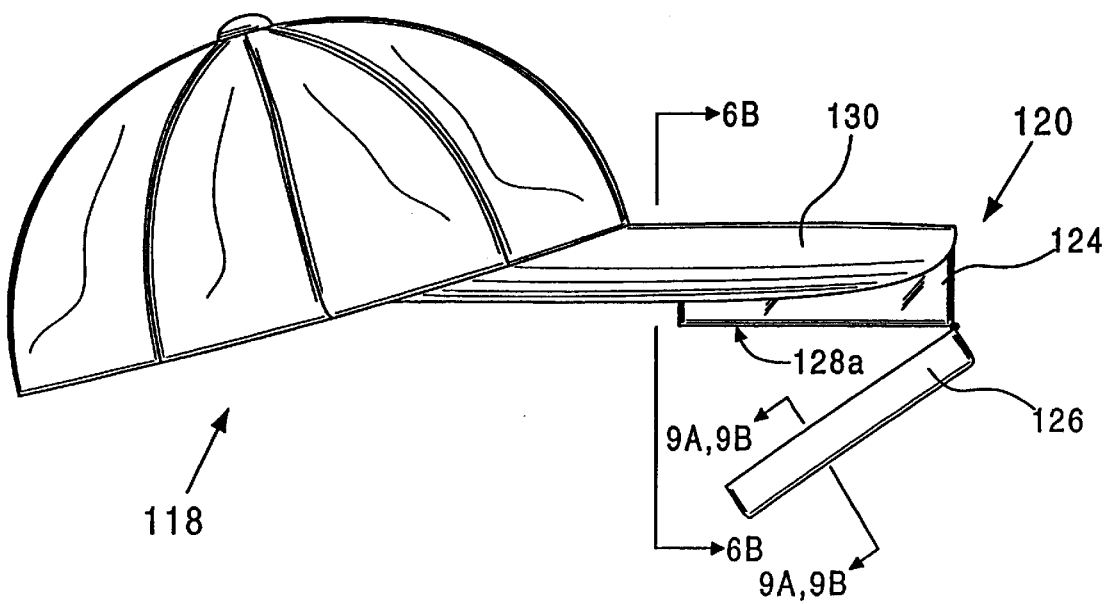

It is important to establish the definition of several terms that will be used throughout this disclosure. The terms 'wearable computer' and 'wearable computer system' are to be assumed to indicate a very portable, self-contained, computer system, which is preferably strapped to, or suitably fixed to, a user or a wearer. The wearer may use such a computer for entertainment purposes (such as playing e-games), important on-the-job related work activities or functions, or other tasks requiring such a system. Also, a wearable computer is preferably one that is easily and quickly accessible when required for computing and or communication activities. The full meaning to the term wearable computer, as it applies to the present invention, will become more apparent with a careful review of this disclosure. The term 'visor' is to be defined as a forward extending bill extending somewhat horizontally from the forehead of a wearer. Accordingly, the position of the visor is to be above the forward looking line of sight of a wearer. The visor may be provided as part of a cap, as shown, or simply fixed to a strap for maintaining the visor (and display) in a desired position, as illustrated in FIGS. 5A and 5B. The phrase 'self-contained and portable', and equivalents thereof, may be assumed to indicate a highly portable system most preferably operated with an internal power source including at least one rechargeable battery. Other important terms, expressions, and phrases, will be defined below as needed.

Referring now to FIG. 1, a high level functional block diagram of a wearable computer system 20 is provided in accordance with the present invention. The computer system 20 is self-contained, portable system, and includes at least a (wearable) computing unit 24 and a visor mounted display 120. As can be seen the computing unit 24 and the visor mounted display 120 may be operatively coupled for use via link 98. As will be discussed below, and as indicated in by the dotted line, a multi-compartment case 30 (as clearly seen in FIGS. 2, 3A and 3B) may be included.

Turning again to FIG. 1, the wearable computer system 20 may further include an auxiliary unit 200. The auxiliary unit 200 may be employed by a wearer to enhance and augment the system. When connected via link 198, the auxiliary unit 200 may operatively couple and make available features, functions, and devices that are not practical to include in the computing unit 24 (for size and or weight considerations). For example, a most preferred embodiment of the Auxiliary unit 200 may include items such as a full (or nearly full) sized keyboard, multimedia components, networking resources, storage devices, communications modules, and or other components.

Figure 2:
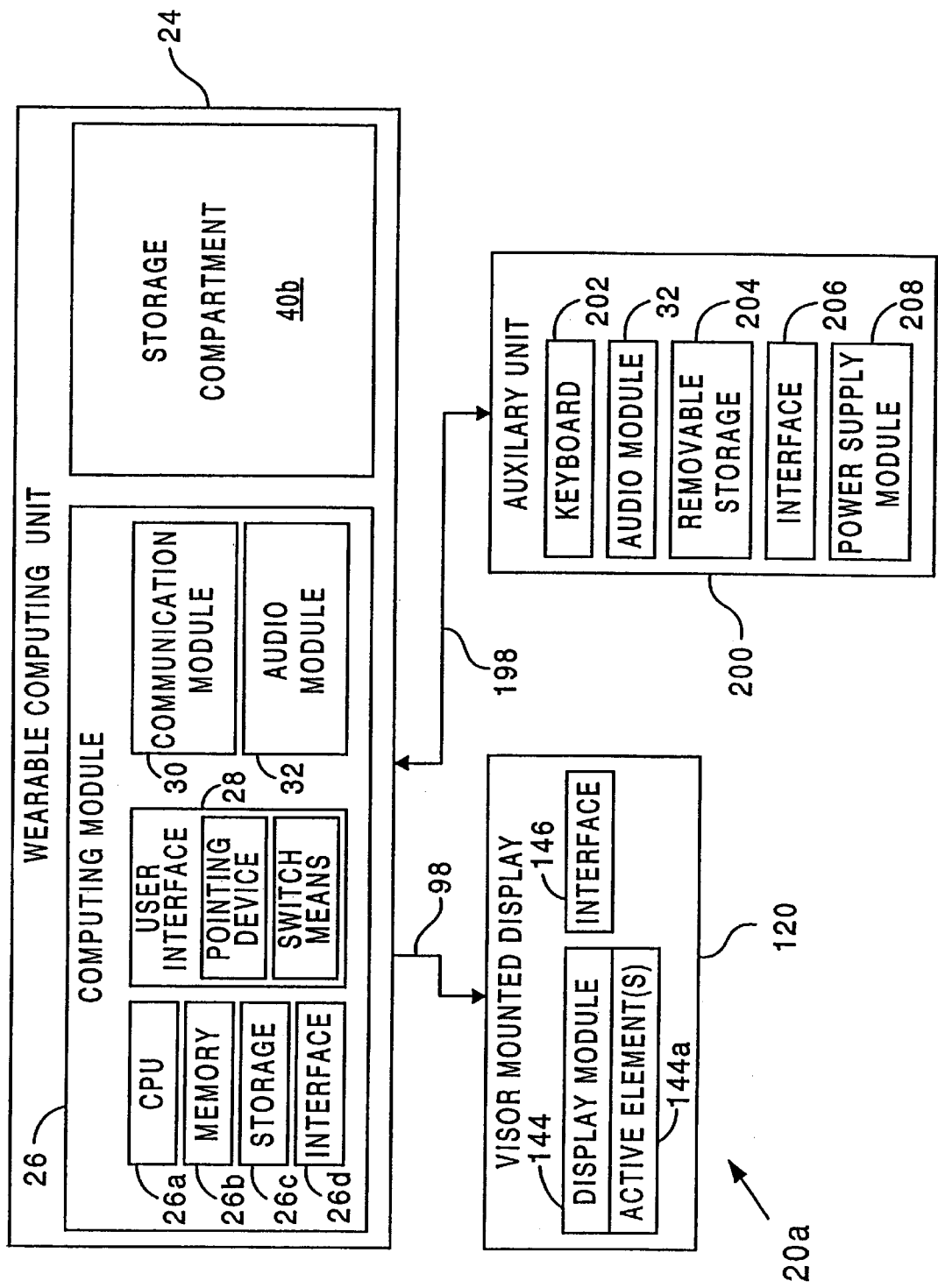
FIG. 2 provides a detailed functional block diagram of an embodiment of a wearable computer system that may include a wearable computing unit, a visor mounted display, and an auxiliary unit.

FIG. 2 provides a detailed functional block diagram of an embodiment of the wearable computer system, designated 20a, which is consistent with FIG. 1. As shown, the computing unit 24 includes a computing module 26. The computing module 26 includes a CPU kernel comprising a CPU 26a, a memory subsystem 26b (RAM, ROM, etc.), a storage sub-system 26c (fixed storage and or removable storage), and other known and possibly required items. Importantly, a communication module 30 may be included to provide required communication functions. For example, if the wearable computer system 20a is to be operated 'off-line', the communication module 30 may simply provide a serial channel to download and upload data. Alternately, if the application requires frequent or constant connectivity, the communication module 30 may include components to support a wireless (on-line) link to another system. As such, a wireless link may be provided as a line-of-sight Infrared (IR) link, a cell-type communication link, or a suitable satellite link, again as required. Further, the capabilities of the computing module 30 may vary significantly with the application requirements. The same can be said for the audio module 32. The capabilities of the audio module 32 may range from simple tone generation for annunciation to voice synthesis/generation, as required by specific applications. An astute reader, and certainly those skilled in the art, may note that a 'user interface' often includes items such as displays, audio components, annunciators, etc. Although this is generally true, the user interface 28 of the present embodiment may be assumed to represent a sub-set of I/O devices available to the wearer/user: essentially a plurality of input devices. For example, as illustrated the user interface 30 of FIG. 2 may preferably include (at minimum) a pointing device and switch means. Briefly, these devices are provided to enable the wearer to input commands, responses, and data, to the computing module 26, as required. However, other components and devices may be included with, or simply grouped with, the user interface 28, as needed to support a specific application. Therefore, it must be understood that the architecture of the embodiment of the computing unit 24 (and the computing module 26), represents one of many possible architectures that may be provided by skilled individuals upon a review of this disclosure.

Returning again to FIG. 2, an embodiment of the visor mounted display 120 includes a display module 144 and active (display) elements 144a. The visor mounted display 120 is operatively coupled to the computing unit 24 by operative link 98 when in use or when ready for use. When being used or soon to be used, the visor mounted display would be situated, or worn, upon the head of a user. Importantly, the visor mounted display 120 is structured to enable a movable portion thereof to be selectively moved by a wearer between a closed (up) position, enabling improved forward vision by the wearer, or an open (down) position enabling the wearer to view information presented to the wearer by way of a display means of the visor mounted display 120. The information viewed by a wearer is coupled from the computing unit 24 by a link 98 to the visor mounted display 120. More detailed discussions of preferred embodiments of the visor mounted display, and embodiments of a display means thereof, will be provided when referring to FIGS. 5A through 9B. FIG. 2 also depicts a generalized embodiment of an auxiliary unit 200 employable with the wearable computer system 20/20a of the present invention. As illustrated, the auxiliary unit 200 may include one or more items that "enhance and augment" the architecture of the wearable computer system realized by the computing unit 24 and the visor mounted display 120. As depicted, keyboard 202, audio module 32, removable storage devices 204, power supply (and charging) module 208, interface components 206, and or other items may be included with preferred embodiments of the auxiliary unit 200. As discussed above, the specific architectures of components such as the auxiliary unit 200 would be determined by one or more associated applications.

Figure 4:
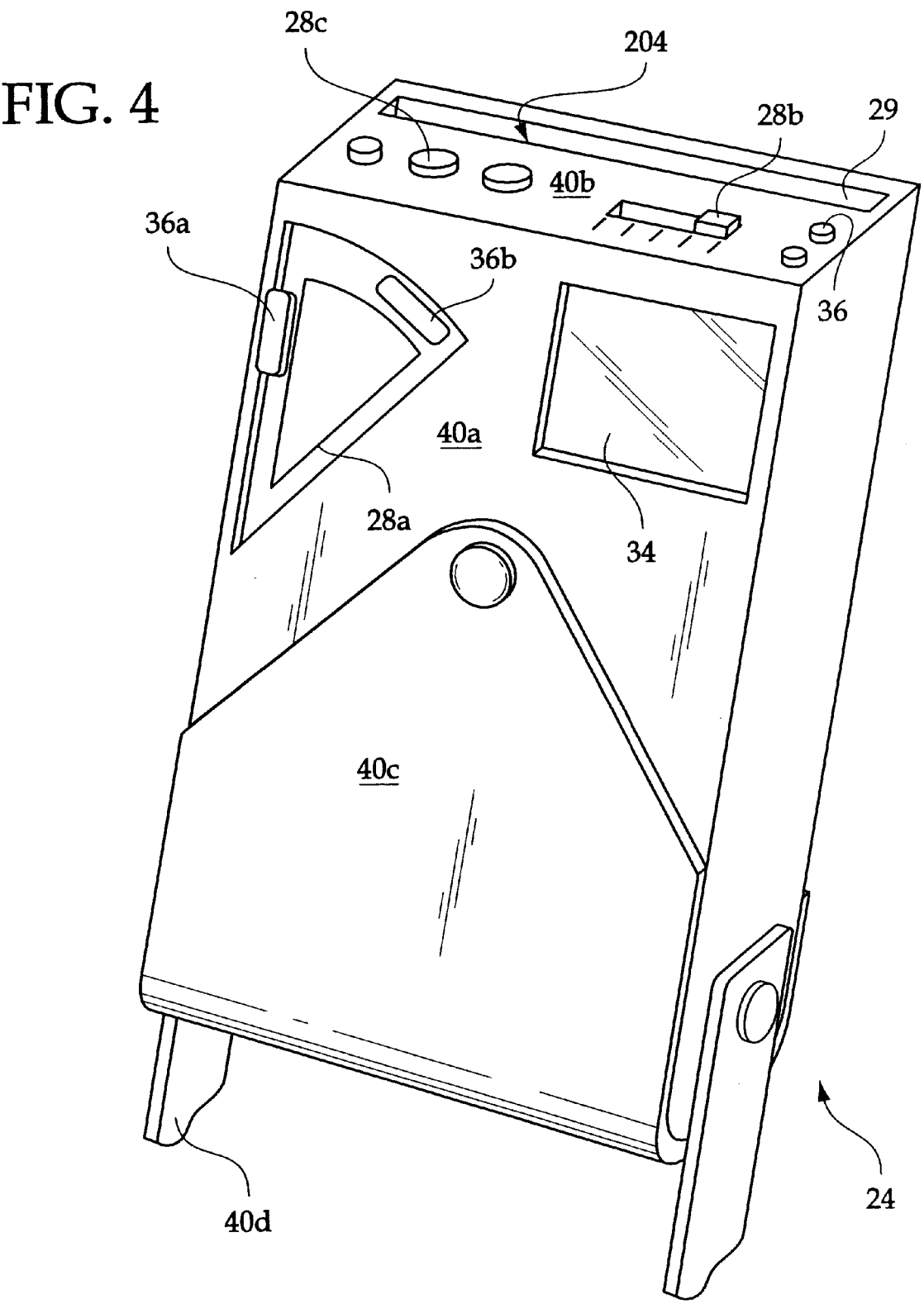
FIG. 4 illustrates a perspective view of a preferred embodiment of a wearable computing unit of the invention in an upturned and usable position.

Referring now to FIG. 3A, an embodiment a wearable computer system 20 is depicted in a profile view (left) and a front view (right). As shown, the case 40 of the computing unit 24 may be structured with a shape similar to a shallow box. The case 40 is most preferably configured such that a wearer may support the case (for example, while the computer system 20 is in use) with at least a first hand, while the first hand may also be used simultaneously to actuate portions of a user interface of the computer unit 24. It may also be noted that the wearable computer system 20 may be operated by a wearer in a plurality of positions (such as sitting, standing, laying down) and a plurality of environments (such as indoors, outdoors, at a shopping location, on a train, etc.). This aspect of the invention will be discussed when referring to FIGS. 12A through 12D. As can be seen in FIG. 3B, embodiments of the multi-compartment case 40 are preferably configured having at least a first compartment 42a and second compartment 42b. The computing unit 24 may be appropriately secured in the first compartment 42a, preferably with portions of a user interface thereof conveniently accessible to a wearer, as shown in FIGS. 3A and 4. The second compartment 42b may be structured to support the quick and convenient storage of the visor mounted display 120 when not required to present information to the wearer. As shown, a flap 40c may be included to provide access to the second compartment 42b. Importantly, it should be noted that the case 40 may alternately be provided via a housing of the computing module 26, wherein the housing houses the components of the computing unit 24, while also structured with a compartment to securely hold the visor mounted display. As such, the term 'case' as employed with descriptions herein of the present invention is to be broadly defined.

Most preferred embodiments of the invention will include a means to support the case 40 of the wearable computer 20 removably, yet securely, upon the body of a wearer. For example, as shown in FIG. 3A, a strap 40d, may be included as a shoulder or neck strap. Skilled persons will certainly be able to provide other "means to support the case" in accordance with the present invention. For example, a properly constructed holster style case (not shown) may be employed in certain applications in place of the strap 40d.

Turning now to FIG. 4, illustrated therein is a perspective view of a preferred embodiment of a wearable computing unit 24 of the invention in what may be termed an 'upturned position'. When considering the embodiment of FIGS. 3A and 4, if the computing unit 24 is in the position depicted in FIG. 3A, the computing unit 24 may be said to be in a normal or possibly unused position. Further, when in the position illustrated in FIG. 4, the computing unit 24 may be said to be turned up or in use, and more generally in the grasp of the wearer. It is contemplated that the embodiments provided in FIGS. 3A through 4, would most preferably be operated and used in the position shown in FIGS. 4, 12C, and 12D. However, as will be discussed below, the user interface 28 is configured such that a wearer may also operate the wearable computer system 20/20a in the position shown in FIG. 3A.

Returning to FIG. 4, a configuration of a user interface 28 is provided including a touch pad 28a (i.e., a pointing device), along with a plurality of ergonomically positioned push button switches 36a and 36b. These items, which are a portion of the user interface 28 may preferably be located upon a first surface 40a of case 40. For convenience, when generically referring to the push button switches, including switches 36a and 36b, the designation 36 will be used. It may be assumed that one or more of the push button switches 36 may be configured to operate in conjunction with the touch pad 28a to input 'clicks' and selections. That is, switch 36a may be operated to input 'left clicks', as a standard mouse left button would, while switch 36b may enable a wearer to input 'right clicks'. However, it must be understood that the user interface of FIG. 4 is but one preferred example of many possible configurations of portions of the user interface 28.

As shown in FIG. 4, a second surface 40b of case 40 may be configured with additional items available to configure and operate the computing unit 24. As shown, items such as slide controls 28b, annunciators 28c, and removable storage (disk) slot 29 may be provided upon the second surface 40b. It is important to understand that the specific items composing the user interface 28, the components included in the computer unit 24, and the location of access to such items may vary considerably from the illustrated embodiments of the computing unit 24. In addition, although a flap 40c is provided with the illustrated embodiment of case 40 as shown in FIGS. 3A, 3B, and 4, other arrangements may be provided to enable access to the first compartment 42a and second compartment 42b.

As illustrated in FIGS. 3 and 4, the computing unit 24 is preferably ergonomically structured to enable a wearer (user) to simultaneously support the computing unit 24 with a hand, while also using and operating at least a portion of a user interface 28 thereof with the same hand. Accordingly, most preferred versions of the case may be structured to facilitate the secure holding by a wearer, possibly with 'gripping aids' (not explicitly shown) formed into the case 40. The gripping aids may include one or more recesses indentations, hand supporting loops, etc.

Turning now to FIG. 5A, there is depicted a profile view of a visor supported display 120 that may be worn by a user. It may be noted that the terms 'user' and 'wearer', are synonymous and are used interchangeably herein. The embodiment illustrated is fixed to a baseball style cap 118. The visor supported display 120, as can be seen in FIGS. 5A and 5B, includes a main portion 124 that may be fixed to an underside of the visor 130, or another equivalent supporting structure. The main portion 124 of the housing is formed to provide an interior cavity 128 (best seen in FIG. 7) with an opening 128a. The opening 128a provides access to the interior cavity 128, which is arranged to hold items including electronic circuits and a suitable display module 144. A movable portion 126 in further provided that is movably fixed the main portion 124 by a hinge means 134 so as to be movable between a closed (up) position and an open (down)

position. When the moveable portion 126 is in the closed position, as shown in FIG. 5A, the opening 128a is substantially covered or closed. Alternately, when the movable portion 126 is in the open position, as shown in FIG. 5B, an image of the visual information to be viewed by a wearer is available, preferably preserving a portion of the forward looking vision (or view) of the wearer. At minimum, preferred embodiments of the visor supported display 120 will enable a user to see the ground immediately in front of him/her while the movable portion 126 is in the open position. Clearly, the forward looking vision of the wearer may also be significantly increased by the wearer simply lifting or tilting his/her head back. This action will allay the need of the wearer to lift or remove the visor supported display 120 to gain increased vision.

Figure 6A:
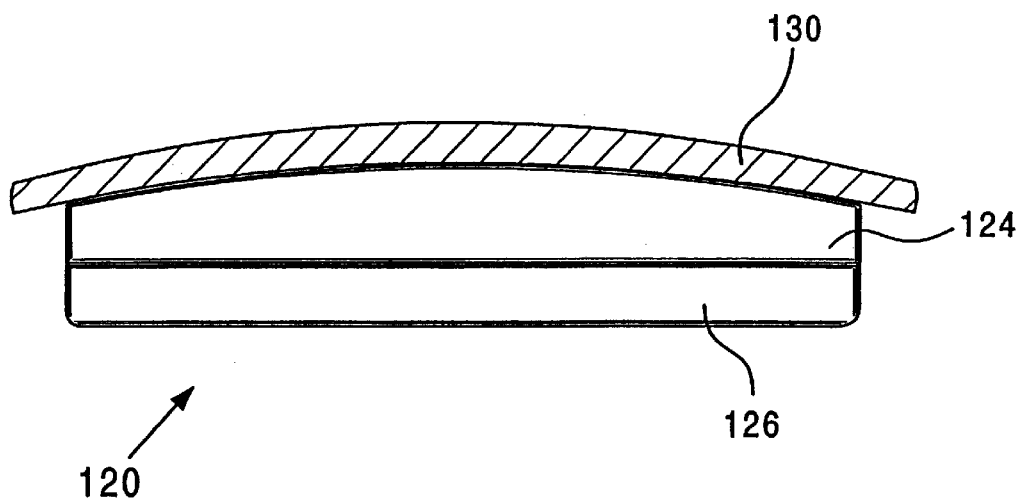
FIGS. 6A and 6B provide views of the visor mounted display system as seen from the perspective of a wearer taken from the line 6A—6A of FIG. 5A and taken from the line 6B—6B of FIG. 5B, respectively.
Figure 6B:
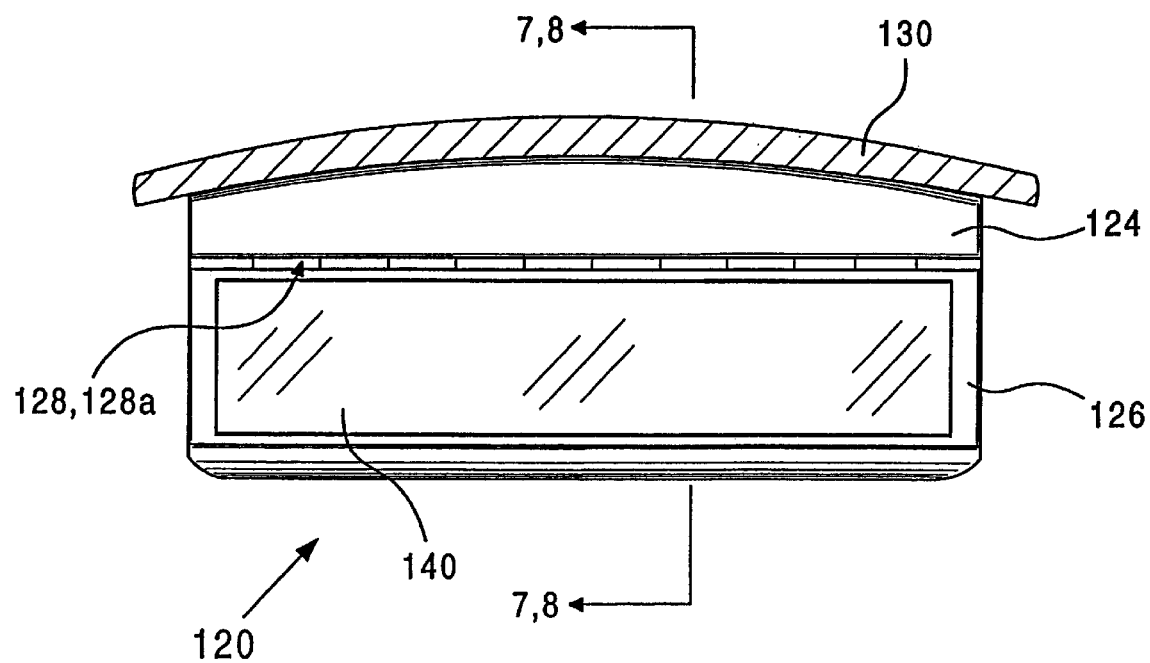

Turning to FIGS. 6A and 6B, views of the visor supported display from the vantage point of a wearer/user are depicted. FIG. 6A, which is taken from view of line 6A—6A of FIG. 5A, illustrates a forward looking view with the movable portion 126 in the closed position. As can be seen, when the movable portion 126 is in the closed position, the forward looking view of the wearer is significantly improved. FIG. 6B, which is taken from view of line 6B—6B of FIG. 5A, illustrates a forward looking view with the movable portion 126 in the down position. As shown in FIG. 6B when the movable portion 126 is in the down position, the preferred embodiments of the invention have a reflective surface 140 fixed to the movable portion 126. The reflective surface 140 will be discussed in detail below.

Figure 7:
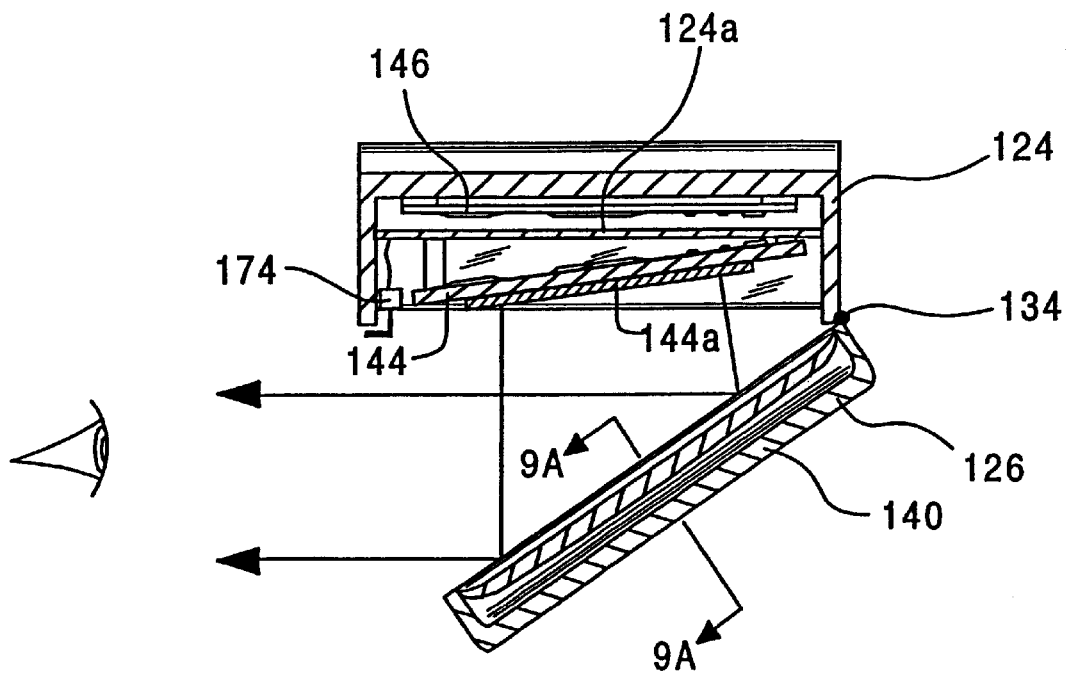
FIG. 7 illustrates a cross sectional side view of an embodiment of a display system with a movable portion in the open or down position.
Figure 8:
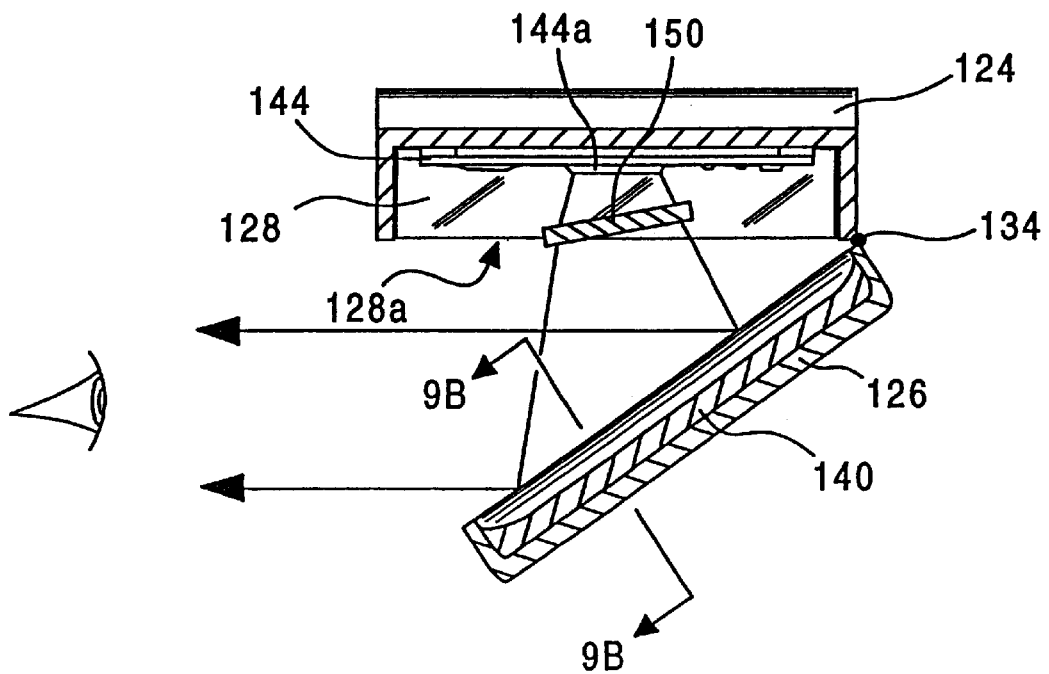
FIG. 8 illustrates a cross sectional side view of another embodiment of the display system of the invention.

Referring now to FIGS. 7 and 8, cross section side view of the visor supported display 120 are depicted. A display means is provided to enable an image of the visual information to be viewed by the wearer. Preferred embodiments of the display means would include a suitable display module 144, which is preferably mounted in the main portion 124 of the housing, to produce an image of the visual information. The image may be magnified by lens 150, when included, which may be employed as shown in FIG. 8, or in other suitable known arrangements. It should be noted that the mounting angle of any included active display elements 144a may be at a substantially different angles from that depicted in FIGS. 7 and 8.

A reflective surface 140, as can be seen in FIGS. 6B through 9B, is suitably mounted to an inner surface 126a of the movable portion 126 of the housing. The reflective surface 140 and suitable geometry's of the active display elements 144a of the display module 144 enable a wearer of the visor 130 to view the visual information provided by the display module 144 via a reflection when the movable portion 126 is in the open position.

Importantly, delivered visual information may be in the form of discrete visual information. The expression 'discrete visual information' may be assumed to indicate the display system can provide a binocular view, enabling one or more images of visual information to be viewed. That is, each eye of the wearer may view different visual information, as required, or the same or similar information. The received information is available for viewing by the wearer (assuming the movable portion 126 is in the open position). It should be noted that the electronic circuitry of the visor mounted display 120, and items such as the display module 144 are to be defined broadly. Accordingly, a single circuit board may be employed, as shown in FIG. 8, or a plurality of circuit boards may be employed as shown in FIG. 7. Skilled persons will also recognize a potential need for interface circuitry that may be required to interface visor mounted display 120 to the computing unit 24. Such circuitry may be provided by either or both of the visor mounted display 120 and the computing unit 24.

As can be seen in FIG. 7, the main portion 124 of the housing may include a partition support wall 124a. The partition support wall 124a enables an interface module 146 to be mounted under the display module 144 (and the active display elements 144a thereof), if required.

It may be noted that the visual information delivered to a wearer is available to the wearer 'hands-free'. A most preferable embodiment would simply require a user to open or flip down the movable portion 126, and the information may be viewed. Accordingly, it is contemplated that a switch means, for example a micro-switch, may be provided to turn off the visor supported display when the movable portion 126 is in the closed position, and turn on the visor supported display when the movable portion 126 is placed in the open position.

Figure 9A:
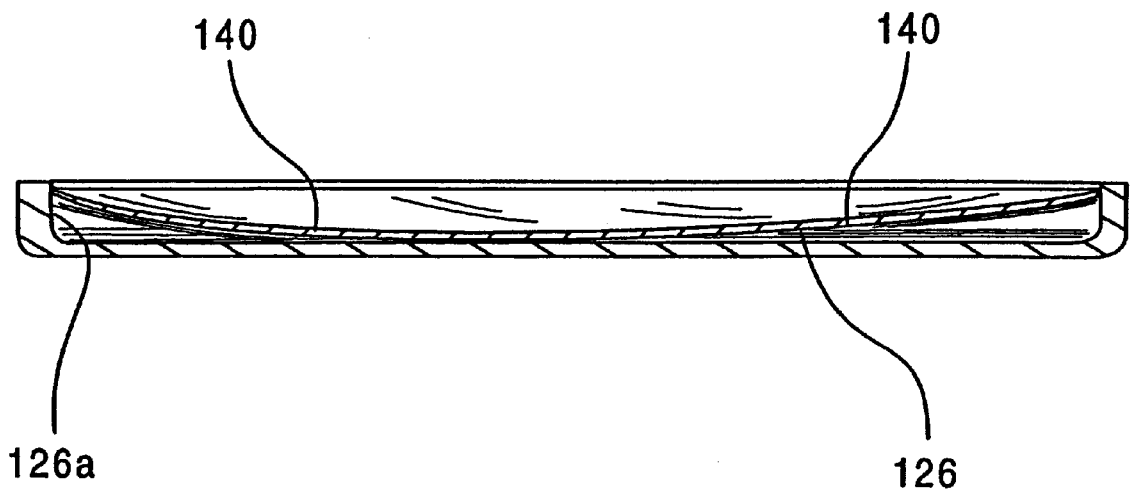
FIG. 9A provides a cross sectional view of an embodiment of the movable portion taken along the line 9A—9A of FIG. 7.
Figure 9B:
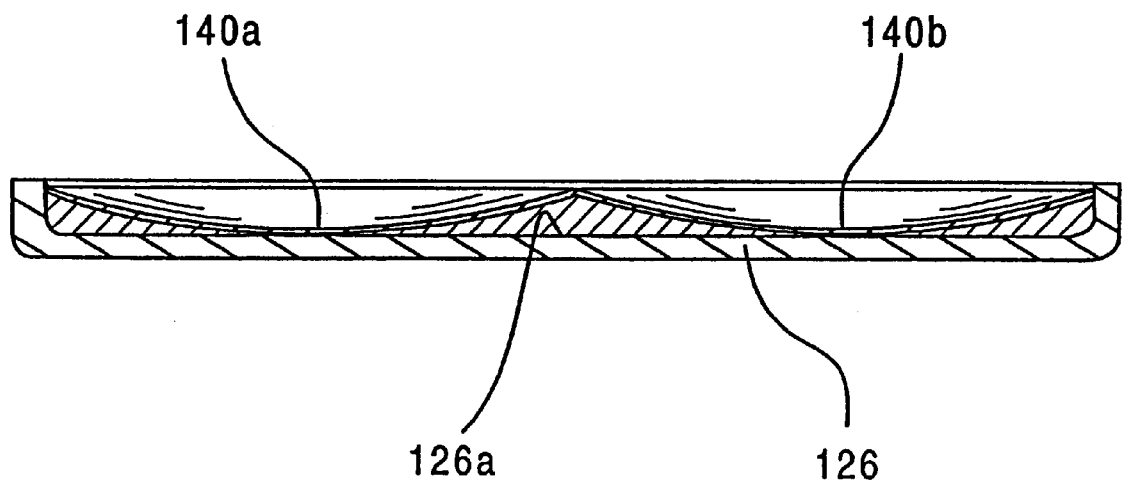
FIG. 9B provides a cross sectional view of an alternate embodiment of the movable portion taken along the line 9B—9B of FIG. 8.

Turning now to FIGS. 9A and 9B, several embodiments of the reflective surface 140 are depicted. In FIG. 9A a simple embodiment of the reflective surface 140 is shown with a slightly concaved shape. In contrast, the embodiment of FIG. 9B provides a binocular reflection surface having two equivalent concaved regions. It is contemplated that the arrangement of FIG. 9B may best be embodied with a pair of active display elements. Each active display element 144a may further generate a distinctive image of visual information to be viewed by the user/wearer. The concaved shape depicted in FIGS. 9A and 9B provides a reflective surface 140 that may be used to magnify or controllably distort (in a desired manner) the image of the visual information provided by the display module 144 that is reflected and viewed by the wearer.

It is important to understand that the description of the embodiments of the visor supported display 120 provided herein are illustrative only, and other equivalent arrangements are certainly possible. For example, an embodiment of the display module 144 of FIG. 7 may include an active display element 144a, say provided by a high resolution liquid crystal display (LCD) type of display. It should also be understood, that the LCD display may be mounted to the movable portion 126 of the housing, with the reflective surface 140 omitted. Therefore, the main portion 124 of the housing may simply contain electronic circuits, including any required interface circuitry, as well as any required power supply and or power regulation circuitry.

Figure 11:
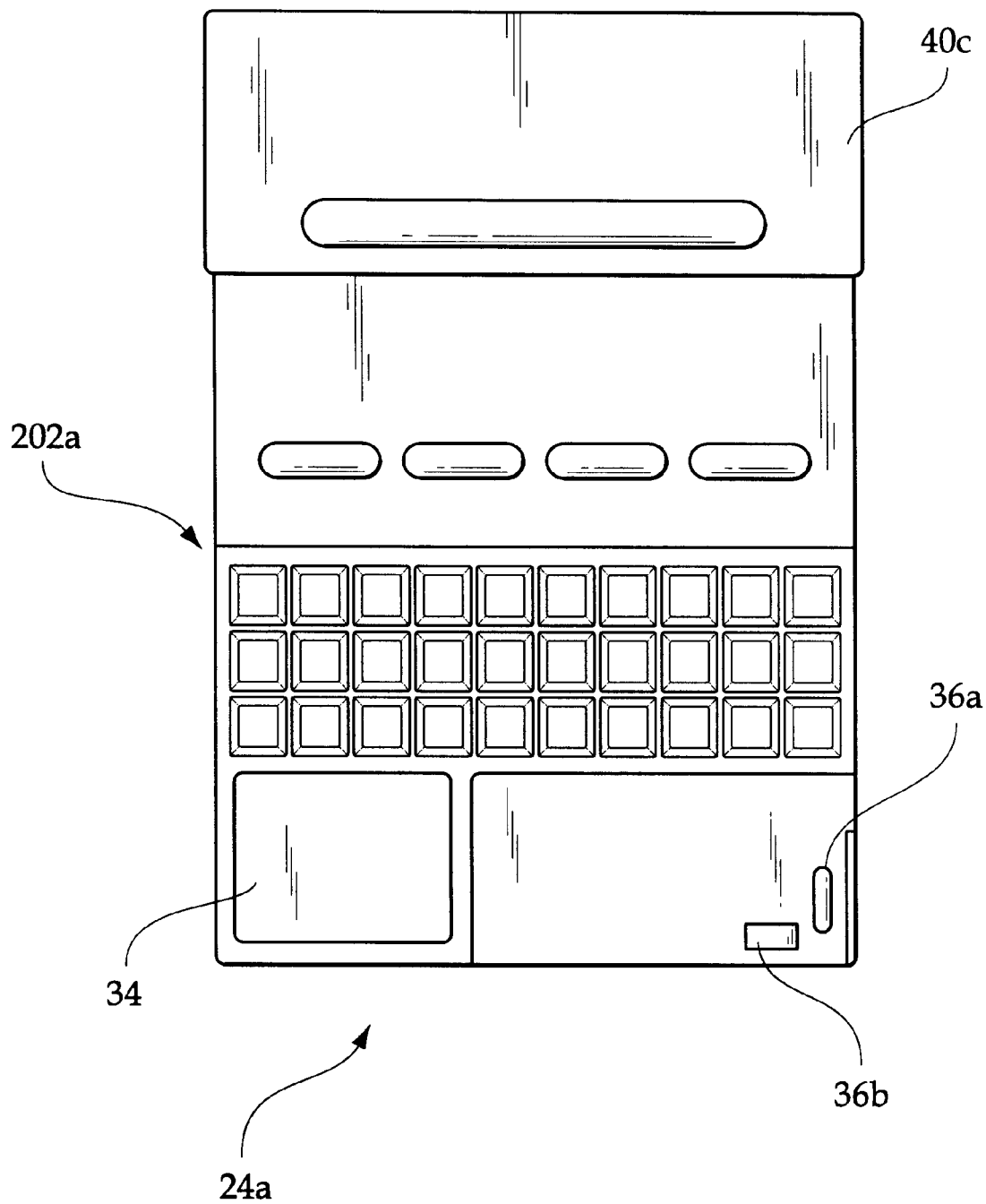
FIG. 11 depicts an alternate embodiment of the computing unit including a user interface having a keyboard.

Turning now to FIG. 10, an exemplary embodiment of an auxiliary unit that may be employed by a wearer to enhance and augment the wearable computer system 20 is illustrated in a plurality of orthogonal views. The top most view depicts a rear panel 200c. As is common with many computers items such as interface connectors 200ca and power cable 200cb may be mounted on or connected to the rear panel 200c. The auxiliary unit 200 may include a power supply module 208 (see FIG. 2) that would power the auxiliary unit, as well as other units of the wearable computer system 20 when coupled thereto, and further may be configured to charge internal batteries of the computing unit 24 and possibly the visor mounted display 120. As can be seen in the (centered) top view of this embodiment, a keyboard 202 may be provided on a top surface 200a of the auxiliary unit 200. As depicted, the auxiliary unit 200 may be configured to include a full-sized keyboard. Turning to the side panel 200d, the auxiliary unit 200 may provide access to devices such as removable storage devices 204, for example a CD-ROM. The removable storage device 204 would of course be positioned so as not to interfere with internal components of the wearable computer system, and to avoid interfering with provisions therein intended for storage of the cap. As shown in the lower view, a front panel 200*b,* may be configured with a floppy or other removable media device. Importantly, it must be understood that the embodiment of the auxiliary unit 200 of FIG. 10 is purely illustrative only. Clearly, a large variety of configurations are possible, as determined by the needs of a user and specific applications in which the computing system 20/20*a* is to be employed. Further, each embodiment of the auxiliary unit 200, may most preferably be matched with a corresponding variant of the computing unit 24 (that best compliments the specific auxiliary unit). For example, an alternate embodiment of the computing unit 24*a* is provided in FIG. 11. As clearly shown, a keyboard 202*a* may be included with the computing unit 24*a.* Accordingly, it may not be necessary to provide the keyboard 200 with the auxiliary unit of FIG. 10 (as the keyboard 202*a* of the computing unit 24*a* may suffice).

Figure 12A:
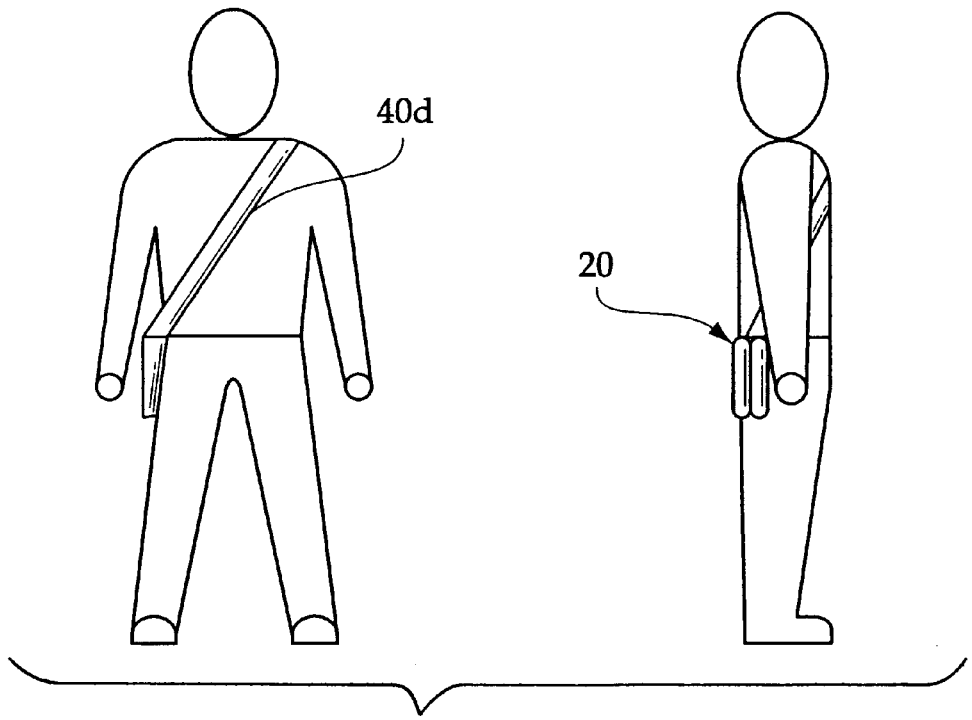
FIG. 12A illustrates a user carrying the wearable computer system of the invention upon the user's body (via a strap arrangement).
Figure 12B:
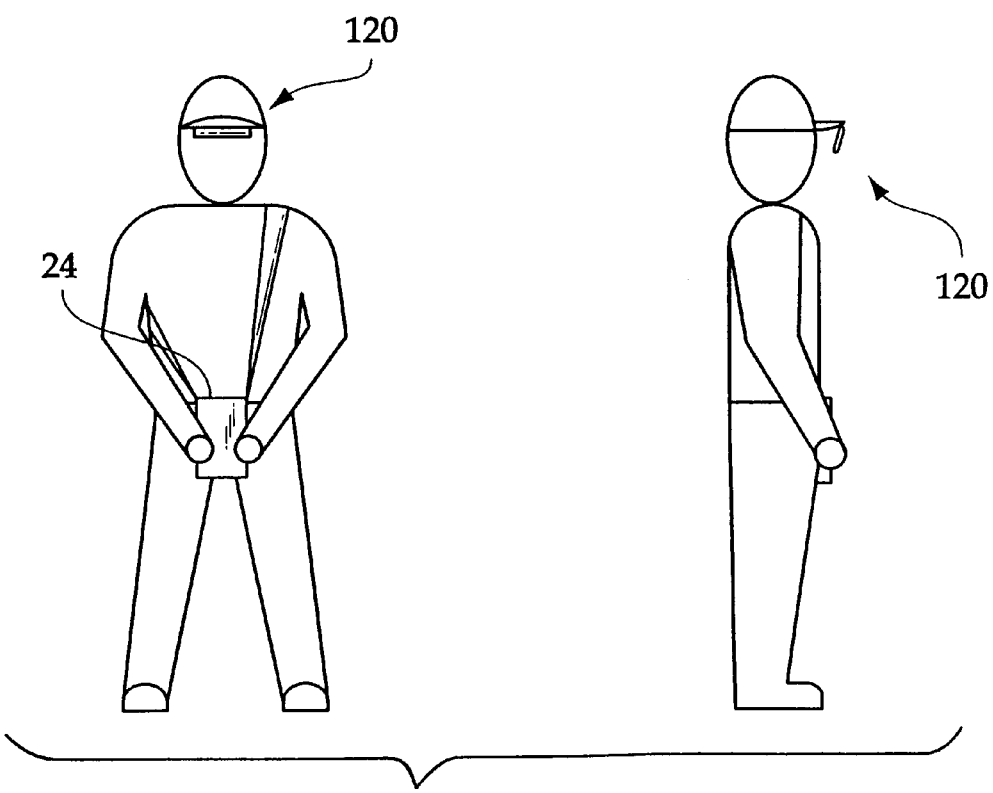
FIGS. 12B through 12D illustrate a user holding and or operating a computing unit of a wearable computer system in accordance with the present invention.

Turning now to FIGS. 12A through 12D, there are illustrated therein several preferred positions for carrying and or utilizing the wearable computer system 20/20*a* of the present invention. As depicted in FIG. 12A, the wearable computer system 20/20*a* may be strapped (via strap 40*d*) to a user's torso. It may be assumed that the visor mounted display 120 is presently stored within the case of the computing unit 24/24*a.* In FIG. 12B, the wearer has removed the visor mounted display 120 from a second compartment 42*b* of the case 40 (see FIG. 3B) and situated display 120 upon his/her head. It may further be assumed that a suitable operative link 98 is established between the display 120 and the computing unit 24. It is contemplated that a wearer may receive graphical information from the computing unit 24 in the positions shown. As can be seen, and as discussed above, the user may grasp the computing unit 24/24*a* with both a first and a second hand, and provide commands and information via a user interface (say, for example, a touch pad 34 and button switches) with fingers of each hand.

Figure 12C:
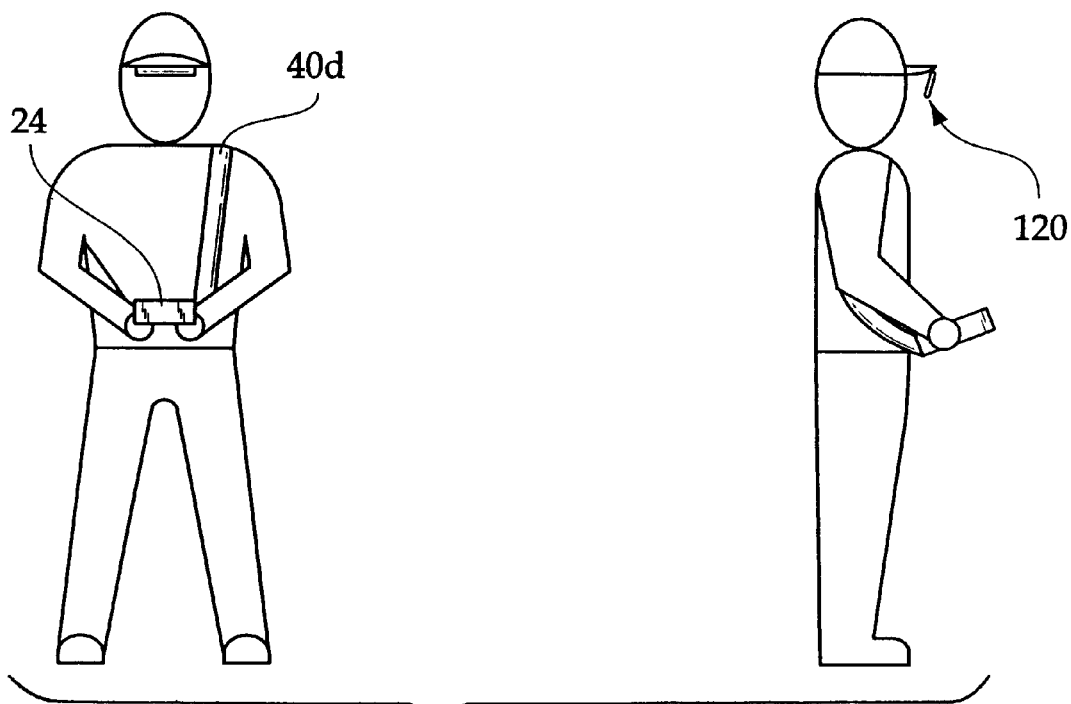
Figure 12D:
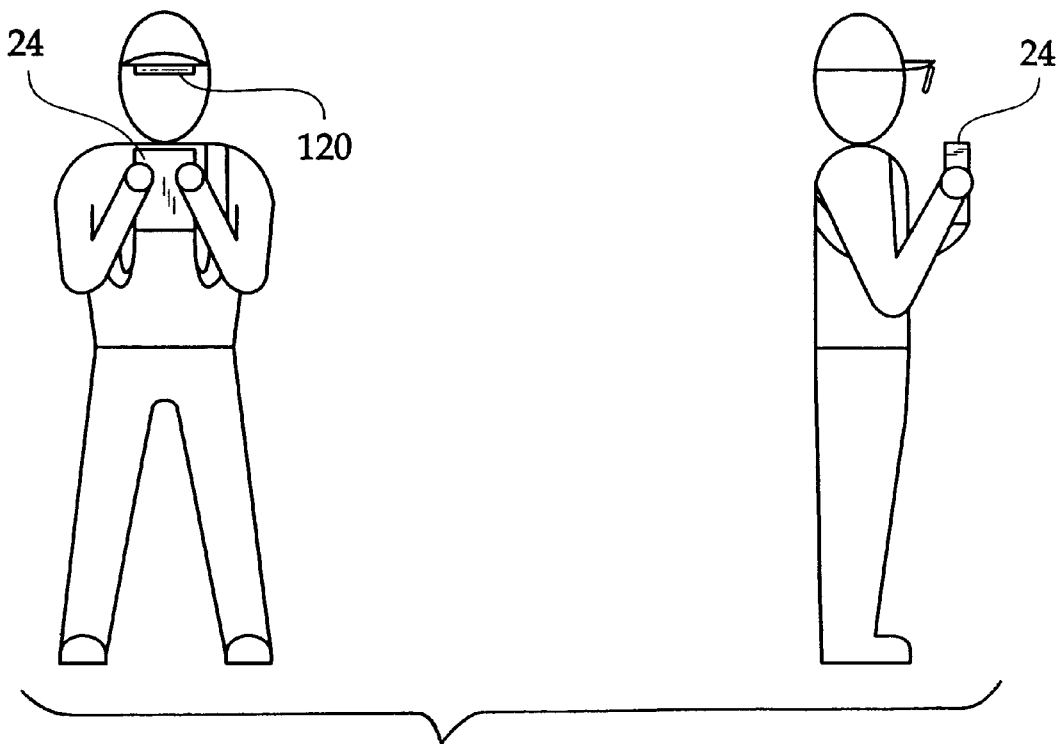

FIGS. 12C and 12D illustrate two other preferred positions that a user may hold the computing unit 24/24*a* when operating the wearable computer system 20. It should be understood that a most preferred operating position, including other positions not illustrated, may actually be determined by the specific task the user needs to perform, the position the task is performed in, and or the specific embodiment of the computing unit 24/24*a* utilized to perform the task. Accordingly, it may be assumed that respective embodiments of the wearable computer system 20 may enable a wearer in a plurality of positions (such as sitting, standing, laying down) and a plurality of environments (such as at home, at a shopping location, on a train, etc.).

In order to not obfuscate the essential functional and operational characteristics of the various embodiments of the invention as illustrated, certain items have been omitted. For example in FIG. 2, the inclusion of a power source, such as a (rechargeable) battery and a power regulator, have been omitted from the block diagram of the computing module 26. Similarly, the coupling of this power source to the visor mounted display 120, or the inclusion of an independent power source within the visor mounted display, is not explicitly shown. These items, as well as other items not shown or discussed, are certainly known to skilled persons, and may certainly provided thereby.

While there have been described the currently preferred embodiments of the present invention, those skilled in the art will recognize that other and further modifications may be made without departing from the invention and it is intended to claim all modifications and variations as fall within the scope of the invention.

What is claimed is:

1. A self-contained, wearable computer system comprising:
 a) a multi-compartment case;
 b) a compact computing unit that is housed within the case, the case and computing unit configured such that a wearer may support the case for use with at least a first hand, while the first hand of a user may also be employed to actuate portions of a user interface of the computing unit while supporting the case;
 c) a visor mounted display, which is operatively coupled to the computing unit, is worn on the head of a user and structured to enable a movable portion thereof to be selectively moved by a wearer between a closed position, enabling improved forward vision by the wearer, or an open position enabling the wearer to view information presented to the wearer on a display unit of the display, the viewed information coupled from the computing unit to the display;
 d) the multi-compartment case including a compartment configured to house the visor mounted display when not being used by the wearer; and
 e) means to support the case upon a wearer's body.

2. The wearable computer system in accordance with claim 1, wherein the user interface includes a pointing device configured so that the pointing device may be operated by the wearer while supporting the computing unit, when the wearable computer system is in use.

3. The wearable computer system in accordance with claim 2, wherein the pointing device is a touch pad.

4. The wearable computer system in accordance with claim 3, wherein the user interface includes a plurality of wearer operable switch means that may be actuated by the wearer to input commands and information to the system.

5. The wearable computer system in accordance with claim 4, wherein a plurality of push button switches of the switch means may be operated with a second hand of the wearer, while the second hand is employed to hold and support the computing unit.

6. The wearable computer system in accordance with claim 1, wherein the computing unit includes:
 a fixed storage unit; and
 at least one removable storage drive.

7. The wearable computer system in accordance with claim 1, further including an auxiliary unit, which may be operatively coupled to the computing unit to enhance and augment the capabilities of the wearable computer system.

8. The wearable computer system in accordance with claim 7, wherein the auxiliary unit includes a keyboard that enables information to be input to the computing unit by a user.

9. The wearable computer system in accordance with claim 7, wherein the auxiliary unit further includes at least one removable storage drive.

10. The wearable computer system in accordance with claim 7, wherein the auxiliary unit further includes a power supply module capable of charging at least one internal battery of the computing unit while the auxiliary unit is operatively coupled to the computing unit.

11. The wearable computer system in accordance with claim 1, wherein the operative coupling of the visor mounted display to the computing unit is provided by a wireless link.

12. The wearable computer system in accordance with claim 11, wherein the wireless link is provided by an RF-type of wireless link.

13. A self-contained, modular, and wearable computer system that is operable by a wearer in a plurality of positions and in a plurality of environments, the wearable computer system comprising:

a) a multi-compartment case having at least a first compartment and second compartment, the case including means to removably support the case upon the body of a wearer;

b) a compact and portable computing unit that is housed within the first compartment of the case such that a wearer may support the case for use with at least a first hand, while the first hand may also be used simultaneously to actuate portions of a user interface of the computing unit; and c) a visor mounted display, which is operatively coupled to the computing unit when in use, and wearable upon the head of a user, the visor mounted display is structured to enable a movable portion thereof to be selectively moved by a wearer between a closed position, enabling improved forward vision by the wearer when the display is not in use, or an open position enabling the wearer to view information presented to the wearer on the display, the viewed information coupled from the computing unit to the display;

d) the second compartment of the case structured to securely hold the visor mounted display when not being used by the wearer.

14. The wearable computer system in accordance with claim 13, wherein the user interface of the computing unit includes:

a) a pointing device located so that the pointing device may be operated by a wearer using one finger of a first hand while the first hand is also employed to hold and support the computing unit; and b) switch means located so that at least a plurality of the switch means may be actuated by a wearer using at least one finger of a second hand while the second hand is also employed to hold and support the computing unit.

15. The wearable computer system in accordance with claim 14, wherein the user interface of the computing unit further includes an audio unit supporting at least the delivery of audio information to the wearer.

16. The wearable computer system in accordance with claim 15, wherein the audio unit further supports wearer voice recognition.

17. The wearable computer system in accordance with claim 13, further including an auxiliary unit that may be operatively coupled to the computing unit to enhance and augment capabilities of the wearable computer system.

18. The wearable computer system in accordance with claim 17, wherein the auxiliary unit includes a keyboard that enables information to be input to the computing unit by a user.

19. The wearable computer system in accordance with claim 17, wherein the auxiliary unit further includes at least one removable storage drive.

20. The wearable computer system in accordance with claim 17 wherein the auxiliary unit further includes a power supply module that charges at least one battery of the computing unit, while the auxiliary unit is operatively coupled to the computing unit.

* * * * *